United States Patent
Beal (10) Patent No.: US 12,247,814 B1
(45) Date of Patent: Mar. 11, 2025

(54) METHOD FOR UNIFORMLY SIZING POLYMER CARTRIDGE NECK

(71) Applicant: True Velocity IP Holdings, LLC, Garland, TX (US)

(72) Inventor: Harold F. Beal, University Park, TX (US)

(73) Assignee: True Velocity IP Holdings, Inc., Garland, TX (US)

(*) Notice: Subject to any disclaimer, the term of this patent is extended or adjusted under 35 U.S.C. 154(b) by 27 days.

(21) Appl. No.: 18/506,110

(22) Filed: Nov. 9, 2023

(51) Int. Cl.
| F42B 33/10 | (2006.01) |
| B29C 35/02 | (2006.01) |
| B29C 37/00 | (2006.01) |
| B29C 57/04 | (2006.01) |
| B29L 31/00 | (2006.01) |

(52) U.S. Cl.
CPC .............. F42B 33/10 (2013.01); B29C 35/02 (2013.01); B29C 37/0057 (2013.01); B29C 57/04 (2013.01); *B29L 2031/7772* (2013.01)

(58) Field of Classification Search
CPC .................................. F42B 33/10; F42B 33/00
See application file for complete search history.

(56) References Cited

U.S. PATENT DOCUMENTS

| 3,099,958 A | 8/1963 | Daubenspeck et al. |
| 3,842,739 A | 10/1974 | Scanlon et al. |
| 4,187,271 A | 2/1980 | Rolston et al. |
| 4,723,472 A * | 2/1988 | Lee ............... F42B 33/10 86/24 |
| 5,221,806 A * | 6/1993 | Chaney ............ F42B 33/14 86/24 |
| 8,561,543 B2 | 10/2013 | Burrow |
| 8,869,702 B2 | 10/2014 | Padgett |
| 8,875,633 B2 | 11/2014 | Padgett |
| 9,261,335 B2 | 2/2016 | Padgett |
| 9,335,137 B2 | 5/2016 | Maljkovic et al. |
| 9,528,799 B2 | 12/2016 | Maljkovic |
| 2011/0179965 A1 | 7/2011 | Mason |
| 2014/0060372 A1 | 3/2014 | Padgett |
| 2014/0260925 A1 | 9/2014 | Beach et al. |
| 2015/0033970 A1 | 2/2015 | Maljkovic et al. |
| 2021/0325158 A1* | 10/2021 | Knowles ............ B23B 5/168 |

* cited by examiner

*Primary Examiner* — Jonathan C Weber
(74) *Attorney, Agent, or Firm* — Burdick Patents, P.A.; Sean D. Burdick; Colin L. Honan (57) ABSTRACT

A method for uniformly sizing polymer-based cartridge necks in ammunition cartridges includes providing a neck sizer and aligning the polymer cartridge below the neck sizer. The cartridge is pressed into the neck sizer where the pressing step causes the cartridge neck to be compressed in the neck sizer so as to reduce the inner diameter of the cartridge neck to less than the maximum outer diameter of the bullet to be fired from the cartridge. The pressing step may also involve compressing excess polymer material from the cartridge neck through flutes in the collet die of the neck sizer to form external neck ribs about the outer surface of the neck. The neck ribs aid in concentrically aligning the polymer cartridge in the chamber of a firearm to improve accuracy of the bullet fired therefrom.

20 Claims, 5 Drawing Sheets

METHOD FOR UNIFORMLY SIZING POLYMER CARTRIDGE NECK

BACKGROUND OF THE INVENTION

Field of the Invention

The invention relates generally to polymer-based ammunition cartridges, and, more particularly, to methods for uniformly sizing the neck diameter of polymer cartridges and associated polymer-based ammunition cartridges.

Description of Related Art

Conventional ammunition cartridges have long been made from brass, which is expensive, heavy, and potentially hazardous. In terms of military use, the weight of brass cartridges en masse adds to the overall weight a soldier or vehicle must carry. This limits the amount of brass cartridges that the individual soldier can carry on their person and presents further logistical issues for transportation and use by military vehicles. For instance, a box of .50 caliber brass ammunition cartridges plus links can weigh about 35 pounds (100 brass cartridges plus links). Military personnel and vehicles, especially winged and rotary vehicles such as fighter jets or helicopters, are therefore limited in the quantity of cartridges they can carry due to the significant weight of these cartridges when considered en masse.

Thus, there has long been a need for a lighter weight alternative to the conventional brass ammunition cartridge. Polymer cartridges have been considered a desirable alternative to brass cartridges for decades, but prior polymer cartridges have not yet met industry and military performance standards.

A key consideration for shooters in selecting the ammunition cartridge to use is the reliability of the cartridge and its consistency in terms of firing the bullet. These factors are especially important for military use purposes where even small inconsistencies in cartridge performance can be the difference between life and death for the soldier.

Many factors are known to impact the reliability and consistency of performance for ammunition cartridges. One such known factor is dimensional variations among discrete component parts of the polymer cartridges. For instance, the overall cartridge length may vary from round to round as a byproduct of the manufacturing process.

Cartridge necks are designed with an inner diameter closely matching the maximum outer diameter of the corresponding bullet to be loaded therein to allow for frictional engagement therebetween. One specific area where dimensional variations from round to round are known to have a detrimental effect on the accuracy of the bullet when fired is the neck. In polymer-based ammunition cartridges, it is known that the diameter of the cartridge neck may have a variation of 0.001 to 0.003 inches in inner neck diameter from round to round. The variation in the inner neck diameter is a byproduct of the manufacturing process used to make the polymer cartridge. However, this variation has a detrimental effect on the accuracy of the bullet fired from the polymer cartridge. The variation in the inner neck diameter of polymer cartridges causes the uneven release of the bullet from the neck when fired and further causes inconsistencies in the bullet-pull value generated from round to round, which can exacerbate the uneven release of the bullet therefrom.

Bullet-pull is a term of art used in the ammunition industry to denote the force required to pull the bullet from an assembled cartridge. Typically, the bullet-pull value is required to be at least 45 to 60 pounds of force but may be higher depending on the ballistic requirements of the round. Inconsistencies in the bullet-pull value from round to round may cause a variation of the internal pressure built up in the cartridge upon firing. A low bullet-pull value may cause insufficient pressure to build up in the cartridge for the firearm to cycle through its recoil mechanism. Further, a low bullet-pull value can cause a significant drop in the terminal ballistics of the bullet because the bullet was released from the cartridge prior to reaching the appropriate pressure threshold. Conversely, too high of a bullet-pull value can cause pressure to build up in the cartridge beyond the capabilities of the weapons platform used, thereby posing a danger to the shooter.

Thus, what is needed is a method for making polymer cartridges that avoids the detrimental effects of dimensional variations from round to round of the cartridge.

SUMMARY OF THE INVENTION

The inventive concepts disclosed herein relate, generally, to methods for uniformly forming polymer-based ammunition cartridge necks. The inventive methods and resulting polymer cartridges embody improved characteristics of increased accuracy and overall terminal ballistics by uniforming the cartridge neck diameter from round to round so that each cartridge has substantially identical bullet-pull values allowing for increased accuracy from round to round of the polymer cartridge.

In one embodiment, the method involves first providing a neck sizer and then aligning the polymer cartridge below the neck sizer. The neck sizer has a housing that encloses a collet die with at least one flute formed therein. The housing further encloses an upper stopper, which removably engages the upper surface of the collet die, and a dowel that extends through the upper stopper and into the collet die. An external lock is removably engaged about the upper end of the housing. The polymer cartridge is thereafter pressed into the neck sizer so that the cartridge neck abuts the upper end of the collet die. The pressing of the polymer cartridge into the neck sizer causes the cartridge neck to be compressed between the collet die and the dowel. The compression causes the inner diameter of the cartridge neck to be reduced below the maximum outer diameter of a bullet configured to be loaded into and fired from the polymer cartridge. In preferred embodiments, the inner diameter of the cartridge neck is reduced to be about 0.004% to 0.030% less than the maximum outer diameter of the bullet.

In some embodiments, the pressing step further involves compressing excess polymer through the flutes of the collet die to form an external neck rib about the outer surface of the cartridge neck. The collet die may include multiple flutes so that compression of the cartridge neck forms multiple external neck ribs. Preferably, the neck ribs are formed equally spaced apart about the cartridge neck. In some embodiments, there may be four neck ribs that are about 900 apart from one another. The neck ribs are designed to aid in the concentric alignment of the polymer cartridge in a firearm chamber to increase the concentric release of a bullet therefrom. The dimensions of the neck ribs may vary depending the caliber the polymer cartridge is and the weapon platform that is going to be used. In some embodiments, the height of the neck ribs is substantially equal to about 0.001 inches to about 0.010 inches. The height of the neck rib is measured as the distance the rib extends outward off the cartridge neck. The width of each neck rib may be substantially equal to about 0.001 inches to about 0.025 inches.

In some embodiments of the method, heat may be applied. The heat may be applied to the cartridge neck prior to pressing the cartridge in the neck sizer. Preferably, the cartridge neck is heated to a temperature below the melting point of the polymer materials. Alternatively or in conjunction with heating the cartridge neck, heat may be applied to the neck sizer. In some embodiments, heat may be applied to the dowel only, heating the dowel to less than or equal to 750° Fahrenheit. Alternatively, heat may be applied to the collet die only, heating the collet die to a temperature less than or equal to 750° Fahrenheit. In further alternative embodiments, heat may be applied to both the dowel and the collet die prior to the cartridge being pressed into the neck sizer. In such cases, the dowel and collet die are heated to a temperature between 70° Fahrenheit and 450° Fahrenheit.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions shown are exemplary only. In the drawings, like reference numerals may designate like parts throughout the different views, wherein:

DETAILED DESCRIPTION OF THE INVENTION

The following disclosure presents exemplary embodiments of methods for manufacturing polymer-based ammunition cartridges that have uniform dimensions from round to round. Particularly, inventive methods for uniformly sizing the neck of the polymer cartridge are disclosed. In other embodiments of the invention disclosed herein, polymer-based ammunition cartridges are disclosed. These cartridges possess uniform inner neck diameters and generate a consistent bullet-pull value from round to round. In some embodiments of the invention, external ribs may be formed on the outer surface of the cartridge neck. The ribs may aid in concentrically aligning the assembled cartridge in firearm chamber to allow for the concentric release of the bullet therefrom.

Note, use of the term "polymer" throughout this disclosure shall be interpreted in a non-limiting fashion and given broad interpretation according to its plain and ordinary meaning. "Polymer" can mean a natural polymer or a synthetic polymer. Examples of polymers as used herein include but are not limited to acrylic, polyethylene, polyolefin, polypropylene, polystyrene, polyvinylchloride, synthetic rubber, phenol formaldehyde, neoprene, nylon, polyacrylonitrile, PVB, silicone, and any of the foregoing in powdered, micronized powdered, or resin form. The polymer can further be homogenously mixed with one or more conventional filler materials, such as glass filler.

The inventive concepts disclosed herein can be applied to virtually any caliber of ammunition, including small and medium calibers for rifles and pistols. Further, the inventive concepts disclosed herein can be applied to certain types of larger caliber ammunition, including large artillery ammunition. Thus, the following disclosure is meant for illustrative purposes only and should be interpreted in a nonlimiting fashion.

Figure 1:
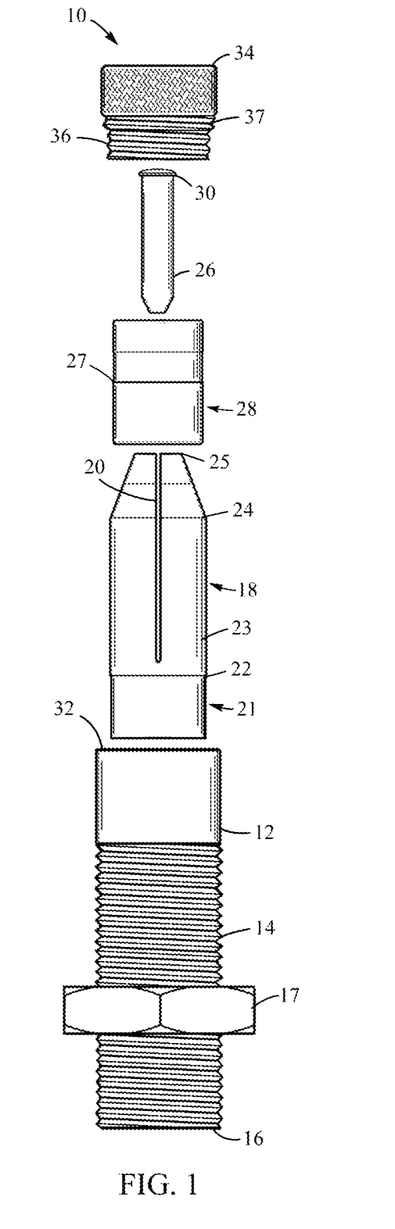
FIG. 1 is an exploded side view of an embodiment of a neck sizer according to the present invention.

FIG. 1 is an exploded side view of one embodiment of a neck sizer 10 according to aspects of the present invention. The neck sizer 10 has an outer housing 12 with threads 14 at the lower end 16. The threads 14 are formed on the outer surface of the housing 12 to allow a nut 17 to be movable up and down the threads 14. In some preferred embodiments, the threads 14 extend approximately three-fourths the longitudinal length of the housing 12. The nut 17 can be a standard hex nut with female threads complimentary to threads 14 on the housing 12.

A collet die 18 is removably enclosed within the housing 12. In preferred embodiments, the outer diameter of the collet die 18 is less than the inner diameter of the housing 12 to allow the collet die 18 to slide therethrough. The lower end 21 of the collet die 18 has a shelf 22 which defines an outer diameter of the lower end 21 less than the outer diameter of the body 23 of the collet die 18. Similarly, the housing 12 includes a change in internal diameter proximate the lower end 16. The change in internal diameter of the housing 12 allows the lower end 21 of the collet die 18 to extend beyond the lower end 16 of the housing 12 without the collet die falling out. The collet die 18 has at least one flute 20 formed through the outer surface thereof. In preferred embodiments, there are at least four flutes 20 formed through the outer surface of the collet die 18. Each of the flutes 20 is preferably positioned an equal distance away from an adjacent flute so as to be radially symmetrically disposed about the collet die 18. The forward end 24 tapers inwardly toward the open tip 25.

An upper stopper 28 is removably engaged about the outer surface of the tapered forward end 24 of the collet die 18 and is movable within the housing 12. The inner diameter of the upper stopper 28 is substantially equal to the outer diameter of the body 23 of the collet die 18 to allow the upper stopper to freely move about the forward end 24 of the collet die. An internal shelf 27, indicated in the side view at the change in diameters, is formed internally to the upper stopper 28 to reduce the internal diameter. The reduction to the internal diameter by the internal shelf 27 prevents the upper stopper 28 from sliding substantially beyond the tapered forward end 24 of the collet die 18. A removable dowel 26 extends through the upper stop 28 and the open tip 25 into the inner cavity of the collet die 18. The dowel 26 has an outer diameter substantially equal to the desired inner diameter of the polymer cartridge neck being sized. An upper flange 30 prevents the dowel 26 from sliding all the through the upper stopper 28.

An external lock 34 is removably engaged to the upper end 32 of the housing 12. Male threads 36 are formed at one end of the external lock 34 and are configured to engage complimentary female threads formed about the inner surface of the upper end 32 of the housing 12. In some embodiments, the external lock 34 may include an O-ring 37 to provide a cushioned surface between the threaded parts.

Figure 2:
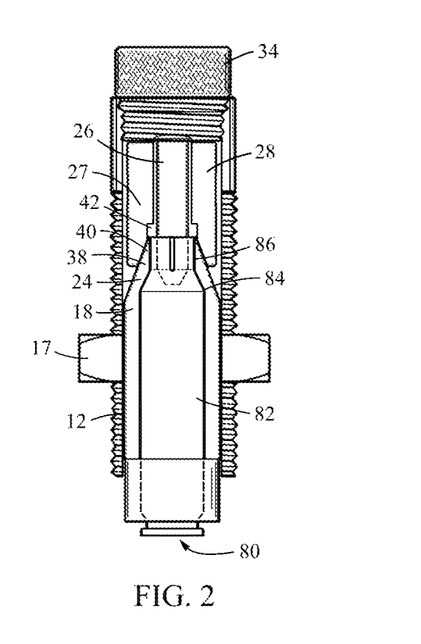
FIG. 2 is a side cross-sectional view of an embodiment of a neck sizer loaded with an embodiment of a polymer-based ammunition cartridge.

FIG. 2 is a side cross-sectional view of an embodiment of a neck sizer 10 loaded with an embodiment of a polymer cartridge 80 according to aspects of the present invention. When assembled, the collet die 20, upper stopper 28 and the dowel 30 are completely contained within the housing 12. The external lock 34 keeps the component parts from falling out of the upper end 32 of the housing. Similarly, the shelf 22 of the collet die 18 keeps the component parts from falling out of the lower end 16 of the housing. The housing 12 preferably has a cylindrical shape.

The polymer cartridge 80 is movable within the neck sizer 10. Specifically, the outer diameter of the body 82 of the cartridge 80 is slightly less than the internal diameter of the body 23 of the collet die 18 so that the cartridge can move therethrough. The tapered forward end 24 is thickened 38 to provide support about the shoulder 84 of the polymer cartridge 80. The thickened portion 38 is tapered 40 to the tip end 25 and provides support about the outer surface of the cartridge neck 86. The dowel 26 extends through the cartridge neck 86 to provide a counter support about the inner surface of the cartridge neck.

When assembled and loaded with a polymer cartridge 80 in a non-pressed position, as is shown in FIG. 2, an empty space or void 42 is left between the tip end 25 of the collet die 18 and the inner shelf 27 of the upper stopper 28. Generally, as the polymer cartridge 80 is pressed upwards into the neck sizer 10, the cartridge is pushed further into the collet die 18 until the tapered forward end 25 substantially fills the void 42 and abuts the inner shelf 27 of the upper stopper 28. The opposing forces exerted against the cartridge neck 86 throughout this pressing action causes the neck to be resized so that the inner diameter of the neck substantially matches the outer diameter of the dowel 26.

Figure 3:
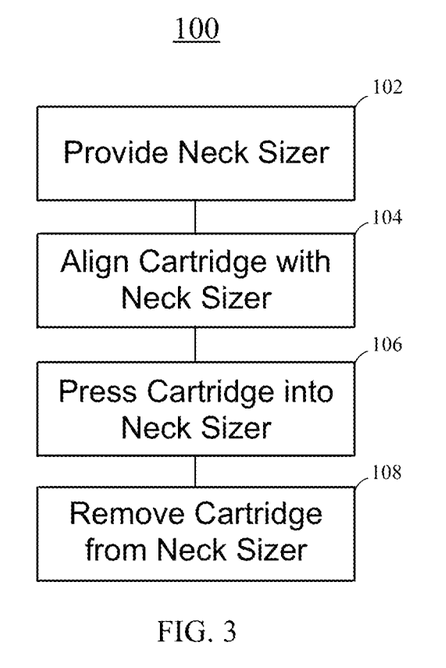
FIG. 3 is a flow chart diagramming salient steps for an embodiment of a method for uniformly sizing a polymer cartridge neck according to the present invention.

FIG. 3 is a flow chart diagraming the salient steps of a method 100 for uniformly sizing a polymer cartridge neck, according to one embodiment of the present invention. Method 100 can be utilized with newly manufactured polymer cartridges as a final manufacturing step prior to loading the cartridge with a primer, propellant powder and bullet in the final assembly. Alternatively, the method 100 can be implemented in an at-home reloading process for previously fired polymer cartridges that a shooter wants to reload and refire.

Method 100 starts with providing the neck sizer 10 at step 102. Thereafter, the polymer cartridge 80 is aligned with the neck sizer 10 at step 104. The polymer cartridge 80 is positioned so that the cartridge neck 86 is substantially concentrically aligned in the collet die 18 through the opening at the lower end 16 of the housing 12. With the polymer cartridge 80 in the preloaded position, the next step 106 involves pressing the cartridge into the neck sizer 10. As described briefly above, as the polymer cartridge 80 is pressed upwards into the neck sizer 10, the cartridge and collet die 18 move upward together to fill the void 42 between the tip end 25 of the collet die and the inner shelf 27 of the upper stopper 28. Throughout the pressing step 106, the walls of the upper stop 28 press inwardly against the taper portion 40 of the collet die 18 to exert a radial force inwardly against the outer walls of the cartridge neck 86. At the same time, the dowel 26 exerts a counter radial force outwardly against the inner walls of the cartridge neck 86. Due to the opposing compressive forces exerted on the cartridge neck 86 and the inherent malleability of the polymer used for the cartridge, excess polymer material present in the neck is forced into the one or more flutes 20 of the collet die 18 to form one or more neck ribs 88 about the outer surface of the cartridge neck. After the pressing step 106, the polymer cartridge 80 is removed from the neck sizer 10 at step 108.

The opposing compressive forces applied to the cartridge neck 86 results in the inner neck diameter being reformed to substantially match the outer diameter of the dowel 26. In preferred embodiments, the outer diameter of the dowel is selected to be slightly less than the maximum outer diameter of the bullet that will be loaded into the cartridge neck 86. The result of this configuration is the inner diameter of the cartridge neck 86 will similarly be slightly less than the maximum outer diameter of the bullet that is to be loaded therein. In some embodiments, the reduction to the inner diameter of the cartridge neck 86 is to be about 0.004% to about 0.1% less than the maximum outer diameter of the bullet to be loaded therein. Preferably, the reduction to the cartridge neck 86 inner diameter is about 0.004% to about 0.030% less than the maximum outer diameter of the bullet to be loaded therein. The reduced diameter of the cartridge neck 86 increases the frictional engagement with a bullet loaded therein while also allowing for the even release of the bullet therefrom. The friction generated may, on its own, be sufficient to achieve a bullet-pull value of at least 45 pounds of force. However, in some instances it may be necessary to apply an adhesive to the inner diameter of the cartridge neck 86 prior to loading the bullet therein to ensure a sufficient bullet-pull value is generated.

In preferred embodiments, the collet die 18 includes four flutes 20 which form four corresponding neck ribs 88 about the cartridge neck 86. In alternative embodiments, the collet die 18 may include more than or less than four flutes 20 to form a corresponding number of neck ribs 88 about the uniformed cartridge neck 86. The formation of the neck ribs 88 provides a ready escape for excess polymer material present in the cartridge neck 86 and can also serve to aid in the concentric alignment of the polymer cartridge 80 in a firearm chamber. The increased concentricity of the polymer cartridge 80 in a firearm chamber serves to further increase the accuracy of the bullet fired therefrom and contributes to the even release of the bullet from the cartridge neck 86.

The specific dimensions of the neck ribs 88 are dependent upon the dimensions of the flutes 20 on the collet die 18 and the amount of excess polymer material present in the cartridge neck 86. In preferred embodiments, the dimensions of the flutes 20 are controlled so that the corresponding neck ribs 88 have a height substantially equal to between about 0.001 to about 0.10 inches, depending on the caliber the polymer cartridge 80 is. In more preferred embodiments, the height of the neck ribs 88 is substantially equal to between about 0.001 to about 0.010 inches. Similarly, the width of the neck ribs is dependent on the dimensions of the flutes 20 and is preferably between substantially about 0.001 to about 0.040 inches, more preferably between about 0.001 to about 0.025 inches. However, it should be understood that for certain types of large caliber ammunition cartridges the dimensions of the neck ribs 88 may be increased due to the increase in the size of the cartridge being formed and the possibility for an increased amount of excess polymer being present due to the increased sized.

Figure 4:
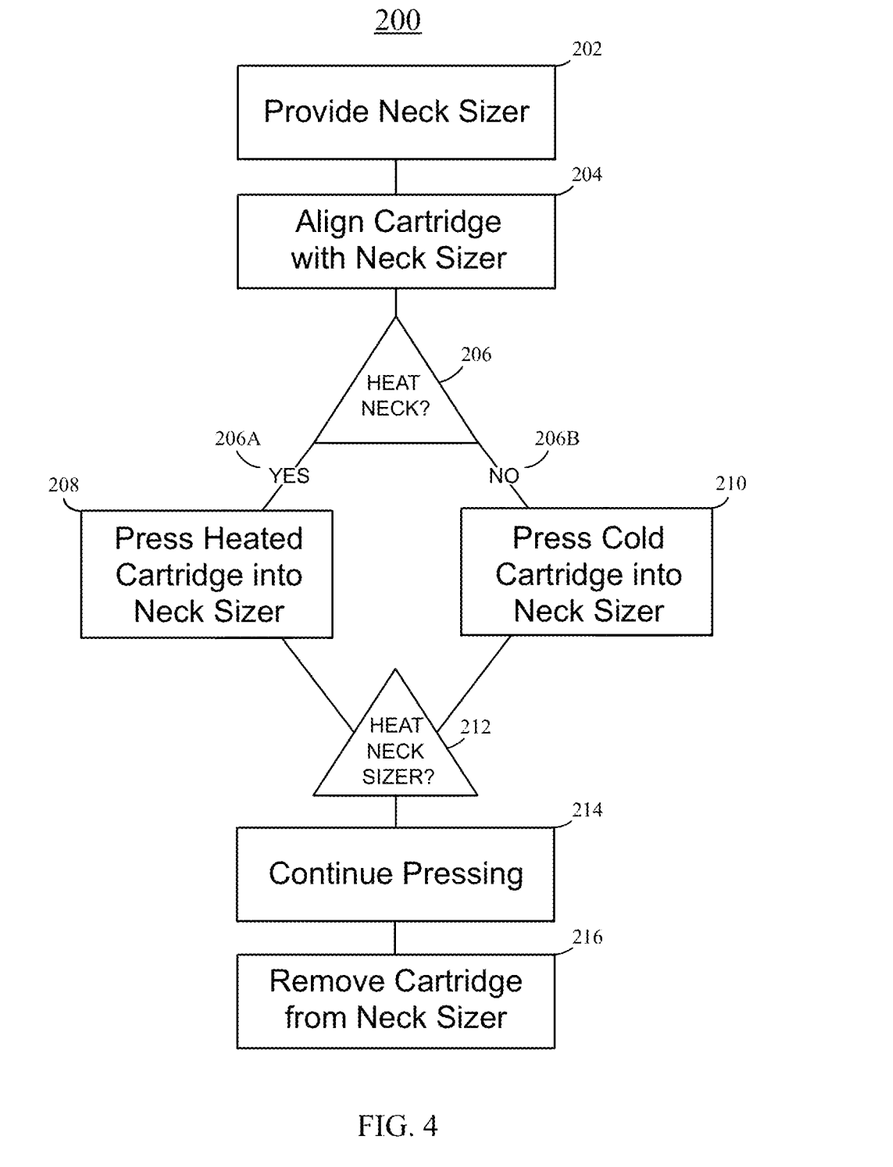
FIG. 4 is a flow diagramming salient steps for an alternative embodiment of a method for uniformly sizing a polymer cartridge neck according to the present invention.

FIG. 4 is a flow chart diagramming the salient steps of an alternative method 200 for uniformly sizing a cartridge neck 86 according to the present invention. The beginning steps to method 200 are similar to method 100 in that a neck sizer 10 is first provided (step 202) and the polymer cartridge 80 is thereafter aligned below the neck sizer (step 204). However, once the preloading steps 202, 204 are accomplished, the operator at step 206 must determine whether to apply heat to the cartridge neck 86 to increase the moldability of the polymer materials. If the answer is "yes," the method advances to step 208 and the heated cartridge neck 86 is pressed into the neck sizer 10. Preferably, the cartridge neck 86 is heated to a temperature below the melting point of the polymer materials used in the neck so the cartridge does not lose its structural form. Depending on the polymer materials used to mold the cartridge neck 86, the heating step 206 may involve heating the cartridge neck to between about 200° Fahrenheit to about 450° Fahrenheit. If the answer at step 206 is "no", then the method advances with cold pressing the cartridge neck 86 into the neck sizer (step 210), similar to step 106 in method 100. Once the cartridge 80 has been sufficiently pressed into the neck sizer 10, the next step 212 is to determine whether heat is to be applied to the neck sizer 10 or not. The heating of the neck sizer 10 can be further broken down into additional steps, as discussed with regard to FIG. 5 below. However, regardless of whether or not heat is applied to the neck sizer 10, the pressing of the cartridge 80 into the neck sizer 10 continues through step 214. Once the pressing is completely finished, the cartridge 80 is removed from the neck sizer 10 at step 216.

The addition of heat to the cartridge neck 86 and/or the neck sizer 10 can reduce the amount of force required throughout the pressing step by increasing the moldability of the polymer materials. Further, application of heat during method 200 may aid in the formation of the neck ribs 88 by increasing the moldability of the excess polymer materials in the cartridge neck 86.

Figure 5:
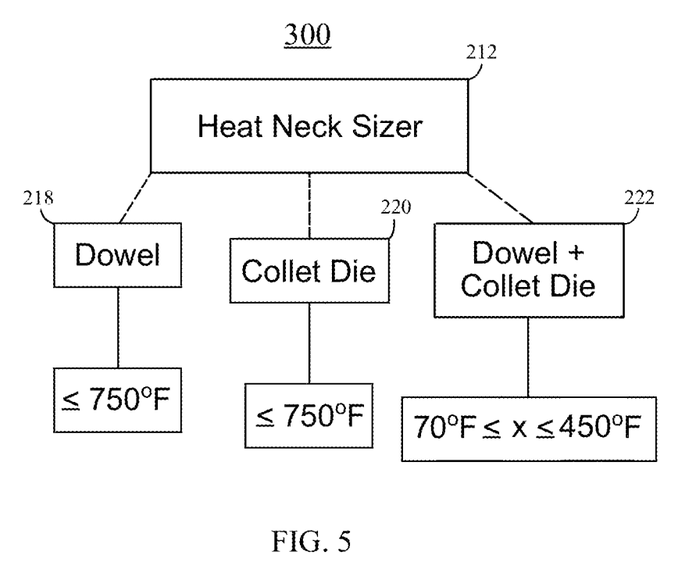
FIG. 5 is a flow chart diagramming certain decision steps unique to the method diagrammed in FIG. 4.

FIG. 5 is a diagram charting additional decisions that may be made with regard to step 212 in various embodiments of method 200 according to the present invention. If at step 212 it is determined that heat is going to be applied to the neck sizer 10, it must then be determined which component pieces of the neck sizer are to be heated. Step 212 can involve heating individual component parts of the neck sizer 10 or heating the entirety of the neck sizer. For instance, step 212 can involve applying heat to the dowel 26 only (decision 218). In such cases, the dowel may be heated to a temperature less than or equal to 750° Fahrenheit. Alternatively, decision 220 involves heating only the collet die 18 rather than the dowel 26. If heating only the collet die 18, it is again preferred to heat to a temperature less than or equal to 750° Fahrenheit. In decision 222, both the collet die 18 and the dowel 26 may be heated together to a temperature between about 70° Fahrenheit to about 450° Fahrenheit. An operator may select from among decisions 218, 220, and 222 depending on the requirements of the final cartridge. Further, for some cartridges, an operator may desire to lessen the force required throughout the pressing step, which can be accomplished by heating the various components of the neck sizer 10, as described herein.

Figure 6:
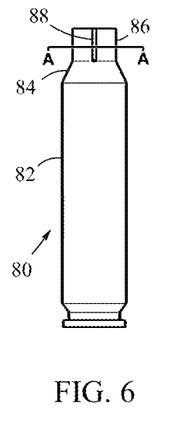
FIG. 6 is a side view of an embodiment of a polymer-based ammunition cartridge that has had the neck uniformly sized according to the present invention.
Figure 7A:
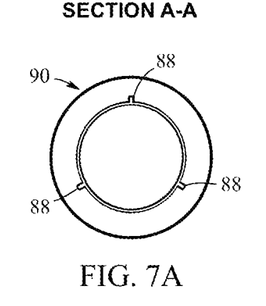
FIG. 7A to 7C are top down views, taken along section lines A-A of FIG. 6, of various embodiments of a cartridge neck that has been uniformly sized according to the present invention.
Figure 7B:
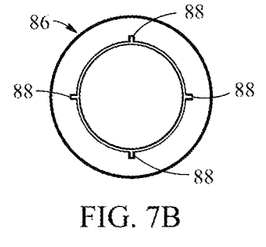
Figure 7C:
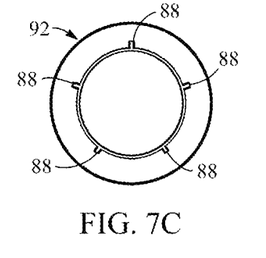

FIG. 6 is a side view of an embodiment of a polymer cartridge 80 that has had the cartridge neck 86 uniformed according to either method 100 or 200. The neck ribs 88 are formed on the outer surface of the cartridge neck 88. FIG. 7A is a top down view of an embodiment of the cartridge neck 90; FIG. 7B is a top down view of an alternative embodiment of a cartridge neck 86; and FIG. 7C is a further top down view of an alternative embodiment of a cartridge neck 92, each of FIGS. 7A-7C taken along section lines A-A of FIG. 6. FIGS. 7A to 7C illustrate various alternative embodiments that include three, four and five neck rib 88 designs. FIG. 7A illustrates a cartridge neck 90 including three neck ribs 88 equally spaced about the outer surface of the neck. FIG. 7B illustrates cartridge neck 86 which has four equally spaced apart neck ribs 88 formed about the outer surface of the neck. FIG. 7C illustrates a cartridge neck 92 having five equally spaced apart neck ribs 88 formed about the outer surface of the neck. While three, four and five ribbed designs have been illustrated, the skilled artisan will recognize that some embodiments may include more than five neck ribs 88 depending on the caliber the polymer cartridge 80 is. Further, in some cases, the cartridge neck 86 may be formed with two opposing neck ribs 88.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method for uniformly sizing a polymer-based ammunition cartridge neck of an ammunition cartridge, the method comprising:
   providing a neck sizer, the neck sizer having a housing enclosing a collet die with at least one flute, an upper stopper removably engaged about an outer surface of the collet die, a dowel extending through the upper stopper and into the collet die, and an external lock removably engaged to an upper end of the housing;
   aligning the cartridge neck below the neck sizer;
   pressing the cartridge into the neck sizer so that the cartridge neck abuts an upper end of the collet die; and
   wherein the pressing of the cartridge into the neck sizer compresses the cartridge neck between an inner surface of the collet die and an outer surface of the dowel to define an internal neck diameter that is less than a maximum bullet diameter for a bullet configured to be loaded into the ammunition cartridge.

2. The method of claim 1, wherein the pressing step further comprises compressing the cartridge neck to thereby force polymer from the cartridge neck into the at least one flute to form at least one external neck rib.

3. The method of claim 2, further comprising forming multiple external neck ribs corresponding to multiple flutes.

4. The method of claim 3, wherein the forming of multiple external neck ribs comprises forming ribs having a height between 0.001 inches to 0.010 inches.

5. The method of claim 3, wherein the forming of multiple external neck ribs comprises forming ribs having a width between 0.001 inches to 0.030 inches.

6. The method of claim 3, wherein the multiple external neck ribs are configured to aid in concentrically aligning the cartridge neck with a bore of a firearm.

7. The method of claim 3, wherein each of the external neck ribs are spaced apart equally.

8. The method of claim 7, wherein the external neck ribs are formed substantially 90 degrees apart.

9. The method of claim 1, further comprising heating the cartridge neck prior to pressing the cartridge neck into the neck sizer.

10. The method of claim 9, wherein the heating step comprises heating the cartridge neck up to a maximum temperature of 750 degrees Fahrenheit.

11. The method of claim 1, further comprising heating the dowel prior to pressing the cartridge neck into the neck sizer.

12. The method of claim 11, wherein the heating step comprises heating the dowel up to a maximum temperature of 750 degrees Fahrenheit.

13. The method of claim 11, further comprising heating the collet die prior to pressing the cartridge neck into the neck sizer.

14. The method of claim 13, wherein the heating step comprises heating the dowel and the collet die to a common temperature.

15. The method of claim 14, wherein the common temperature is substantially equal to 70 degrees Fahrenheit to 450 degrees Fahrenheit.

16. The method of claim 1, further comprising heating the cartridge neck and the neck sizer during the pressing step.

17. The method of claim 16, wherein the heating step comprises heating the cartridge neck to a temperature less than a melting point of the polymer materials forming the cartridge neck.

18. The method of claim 1, wherein compression of the cartridge neck reduces the internal neck diameter to 0.004% to 0.030% less than the maximum bullet diameter of the bullet configured for loading into the polymer-based ammunition cartridge.

19. A method for uniformly forming a polymer-based ammunition cartridge neck of a polymer-based ammunition cartridge, the method comprising:
   providing a neck sizer, the neck sizer having a housing enclosing a collet die with a plurality of flutes, an upper stopper removably engaged about an outer surface of the collet die, a dowel extending through the upper stopper and into the collet die, and an external lock removably engaged to an upper end of the house;
   aligning the cartridge neck below the neck sizer;
   pressing the cartridge into the neck sizer so that the cartridge neck abuts an upper end of the collet die; and
   wherein the pressing of the cartridge into the neck sizer compresses the cartridge neck between an inner surface of the collet die and an outer surface of the dowel to extrude excess polymer material from the cartridge neck through the plurality of flutes forming a plurality of external ribs.

20. The method of claim 19, wherein the pressing step further comprises compressing the cartridge neck to define an inner neck diameter that is 0.004% to 0.030% less than a maximum outer diameter for a bullet configured to be fired from the cartridge.

* * * * *